UNITED STATES PATENT OFFICE 2,350,958

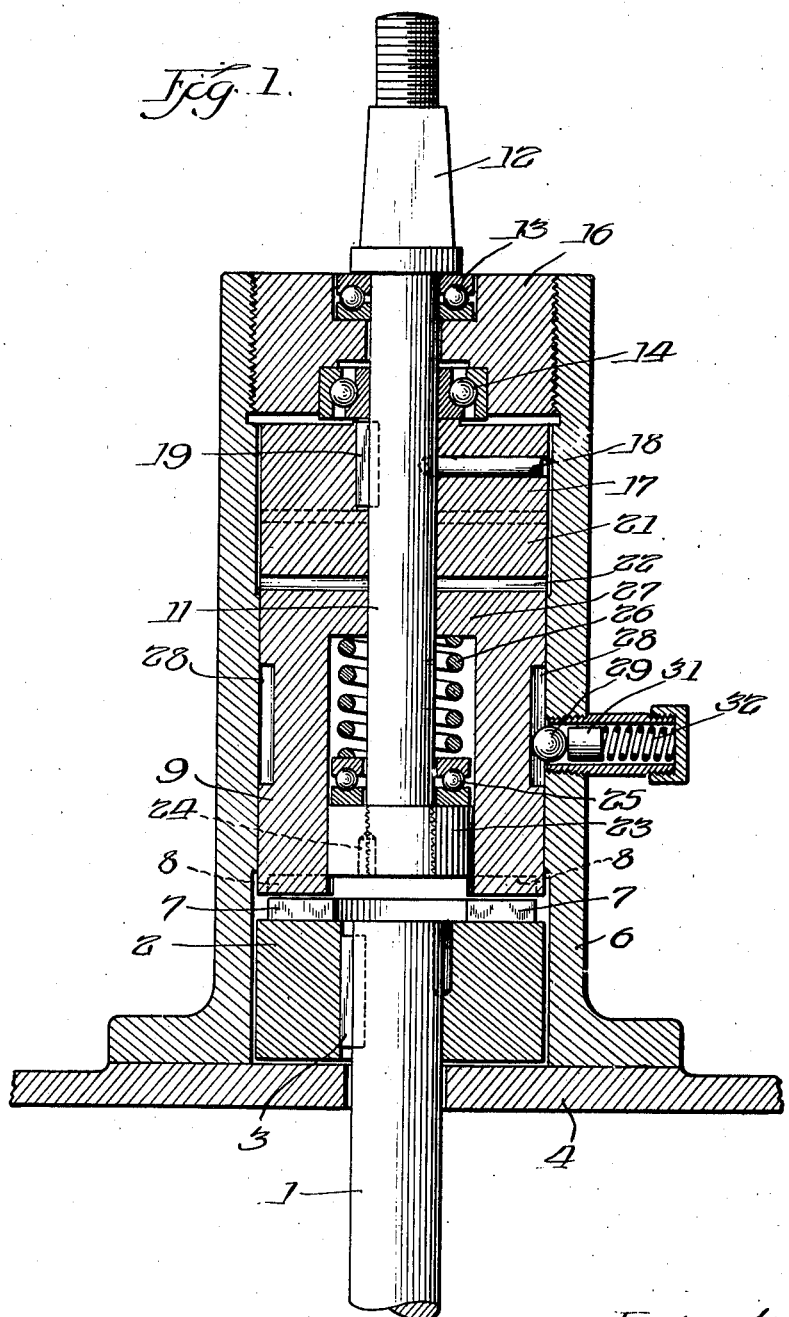

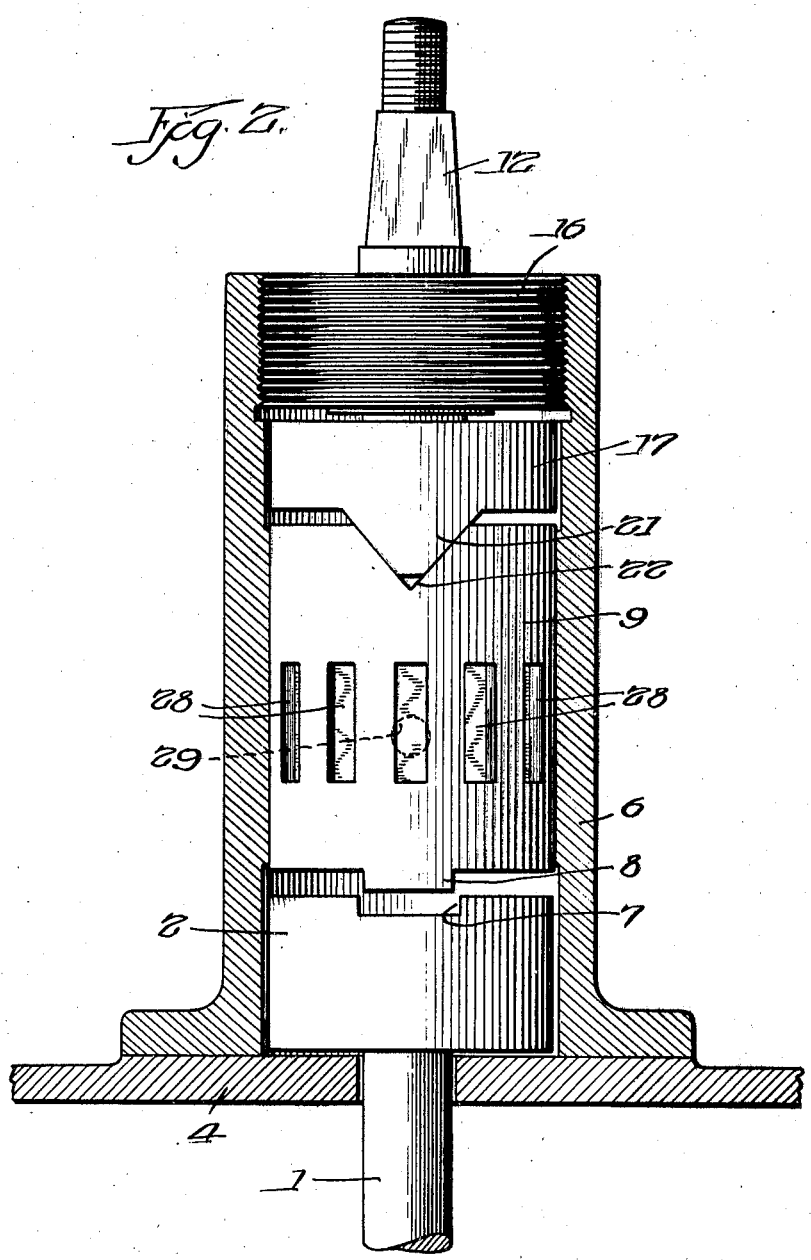

AUTOMATIC HANDWHEEL CLUTCH

Corwin W. Bryant, Downers Grove, Ill., assignor to Crane Co., Chicago, Ill., a corporation of Illinois Application October 15, 1942, Serial No. 462,445

4 Claims. (Cl. 192—54)

This invention relates to an actuating means and more particularly to a new and improved automatic handwheel clutch. It has for one of its principal objects the provision of means for automatically engaging or disengaging the handwheel operator of a valve or similar device having a combination of operating means.

An important object of this invention is to provide a simple compact mechanism for a valve suitable for selective operation so that upon operation of one of said means of operation the other of said means of operation may be disengaged.

Another important object resides in the provision of a safety means whereby the valve handwheel shaft or the like is not normally operable to actuate the valve when the latter is being power driven, the clutch means therebetween being so arranged that when the handwheel is released by the operator after manual actuation the said clutch means are immediately disengaged.

A still further important object is to provide a device in which the rotation of the handwheel shaft accomplishes the sequential engagement of the clutch and the rotation of a valve stem or the like, the device being devoid of gears or levers.

Another important object is to provide a simple compact clutch mechanism for a valve for selective operation, employing friction means for engagement with an operating block for yieldably resisting rotational movement of same and with cam means operable by the valve handwheel or the like to move the said block axially to engage the clutch.

Other and further important objects of this invention will become apparent from the disclosures in the accompanying drawings and the following specification.

In the drawings:

Fig. 1 is a longitudinal sectional assembly view of the automatic handwheel clutch of this invention.

Fig. 2 is a view of the device taken at right angles to Fig. 1 and only partially in section.

As shown in Fig. 1 of the drawings, the reference numeral 1 indicates generally the actuating shaft or stem of a valve or other device (not shown) which is power driven by a suitable motor or prime mover (not shown) preferably positioned at the broken end of the shaft and manually driven by the mechanism at the opposite end of the shaft, as shown. The clutch block 2 is keyed to the shaft 1 by means of the key 3 and retained within the housing defined by the cover plate 4 and the casing 6. Clutch means 7 is mounted on the clutch block 2 which operatively engages the oppositely positioned clutch means 8, the latter member being a unitary part of the operating block 9 of this device. Providing for axial movement of the operator block 9 and its integral clutch means 8 is the prime object of this device and such object is obtained by the novel mechanical arrangement hereinafter described. Mounted centrally of the operator block is the intermediate shaft 11, the upper end of which is adapted to receive a valve operating handwheel (not shown) as indicated at 12. It is the object that by the mere rotation of such handwheel, which rotates the shaft 11 to cause an axial movement of the operator block 9 and thereby cause interengagement of the clutch means 7 and 8, to thus complete a direct drive from the handwheel to the shaft 1. Such axial movement of the operator block is accomplished in the manner hereinafter described.

The handwheel shaft 11 is preferably provided with outer and inner bearings, at 13 and 14, around which the retaining nut 16 threadedly engages the casing or housing 6. A cam block 17 is fixedly held to the handwheel shaft 11 against longitudinal and rotative movements by means of the pin 18 and the key 19 respectively. The cam block 17 is provided with a V cam 21 (more clearly shown in Fig. 2) which functions to engage the V-shaped recess 22 in the operating block 9. A collar 23 threadedly engages the handwheel shaft 11 and after proper adjustment a set screw 24 is positioned in place to thereby prevent further axial movement of the collar 23. Above the collar 23 the ball bearing 25 is placed and upon which is set the spring 26. The operating block 9 is provided with an inwardly extending annular flange 27, as indicated. The spring 26 is held between the bearing 25 and the flange 27 thereby serving to maintain the operating block 9 and its integral clutch means 8 upwardly and normally out of engagement with the clutch means 7.

Positioned circumferentially around the operating block 9 are the longitudinally extending grooves or indentations 28 suitable for the reception of the retarding ball 29 which is spring loaded and thereby forced against the operating block 9 by means of its back-up member 31 and the spring 32.

In considering manual operation, it is thus apparent that rotation of the handwheel (not shown) which is normally mounted upon the square 12 causes like rotation jointly of the cam block 17 and of the operating block 9 by means of the V cam interconnection therebetween. However, it will be apparent also that the spring pressed ball 29 engages one of the grooves or indentations 28 within the operating block 9 and thereby resists the rotation of the said block. Such rotational resistance by the ball 29 causes the V cam 21 to rotate relative to the V-shaped slot 22 within the operating block 9. This relative rotation causes the cam block 17 and the operating block 9 to separate longitudinally, the movement of the operating block 9 being axially downward. The latter axial movement of the operating block 9 results in engagement of the respective clutch means 7 and 8 and therefore the handwheel on the operating square portion 12 of the stem 11 is directly connected to the shaft 1 to effect the desired rotation of the shaft by the handwheel.

It will therefore be seen that by my invention a safety device is provided wherein the handwheel is not normally operable when the valve is being driven by a power means to the extent that the clutch is so arranged that engagement is secured when the handwheel is rotated in either direction but is automatically disengaged by means of the spring 26 when the operator releases the handwheel. It is further apparent that the device is simple and compact and does not employ movable gears or levers such as have been previously deemed necessary in similar devices. Further all parts are arranged to be positioned on a common axis and are confined to relatively short overall dimensions.

Numerous changes may be made and the details of construction varied throughout a wide range without departing from the principles disclosed herein. It is therefore not proposed to limit the patent granted hereon otherwise than as necessitated by the appended claims.

I claim:

1. In a valve actuating mechanism or the like, the combination including valve actuating means comprising a drive shaft, a clutch member on the said shaft, manual operating means, a clutch member driven by the said manual operating means normally out of engagement with the clutch member on the said drive shaft, means operated by movement of the said manual operating means for moving the clutch member driven by the said operating means axially into engagement with the other clutch member so that said drive shaft may be rotated by said manual operating means, means responsive for moving said movable clutch member axially out of engagement with said other clutch member when movement of the manual operating means ceases, said means operated by the rotation of the said manual operating means for moving the clutch member driven by the said latter means axially into engagement with the other clutch member comprising a V-shaped cam cooperating with a V-shaped recess, recessed portions intermediate the V-shaped cam and the clutch member, spring pressed means adapted to engage the said recessed portions whereby when actuation is started the spring pressed means engaging the said recessed portions retards the rotation thereof with a resultant axial movement of the clutch member, resilient means for moving said movable clutch member axially out of engagement with the other said clutch member.

2. In a valve actuating mechanism or the like, a housing, a drive shaft, an operating block mounted for axial and rotational movement in said housing, a clutch interposed between the drive shaft and the operating block, a handwheel shaft journaled for rotational movement in the housing, cam means operable by the handwheel for imparting axial and rotational movement to the operating block, and friction means engaging the operating block to yieldably resist rotational movement thereof and cause the cam means to move the operating block axially toward the drive shaft to engage the clutch.

3. In a valve actuating mechanism or the like, a housing, a drive shaft, an operating block mounted for axial and rotational movement in said housing, a clutch interposed between the drive shaft and the operating block, a handwheel shaft journaled for rotational movement in the housing, cam means operable by the handwheel for imparting axial and rotational movement to the operating block, and friction means engaging the operating block to yieldably resist rotational movement thereof and cause the cam means to move the operating block axially toward the drive shaft to engage the clutch, and means for moving the operating block axially to disengage the clutch upon termination of the rotational movement of the handwheel shaft.

4. In a valve actuating mechanism or the like, a housing, a drive shaft, an operating block mounted for axial and rotational movement in said housing, a clutch interposed between the drive shaft and the operating block, a handwheel shaft journaled for rotational movement in the housing, cam means operable by the handwheel for imparting axial and rotational movement to the operating block, friction means engaging the operating block to yieldably resist rotational movement thereof and cause the cam means to move the operating block axially toward the drive shaft to engage the clutch, and spring means interposed between the handwheel shaft and the operating block for moving the latter axially to disengage the clutch upon termination of the rotational movement of the handwheel shaft.

CORWIN W. BRYANT.